United States Patent [19]
Fernandez

[11] Patent Number: 6,032,099
[45] Date of Patent: Feb. 29, 2000

[54] AUTOMATIC CORRECTION OF KEY ERROR SOURCES IN AN INERTIAL NAVIGATOR

[76] Inventor: Manuel Fernandez, 3422 Laurie Pl., Studio City, Calif. 91604

[21] Appl. No.: 08/747,008

[22] Filed: Nov. 2, 1996

[51] Int. Cl.[7] .................................................. G06F 165/00
[52] U.S. Cl. ........................ 701/220; 701/221; 73/178 R
[58] Field of Search .................................. 701/200, 207, 701/220, 221; 73/178 R, 180

[56] References Cited

U.S. PATENT DOCUMENTS

| | | | |
|---|---|---|---|
| 4,303,978 | 12/1981 | Shaw et al. | 701/220 |
| 4,675,820 | 6/1987 | Smith et al. | 701/221 |
| 5,194,872 | 3/1993 | Musoff et al. | 701/220 |
| 5,410,487 | 4/1995 | Okayama et al. | 701/221 |
| 5,574,650 | 11/1996 | Diesel | 701/221 |
| 5,789,671 | 8/1998 | Fernandez | 73/180 |
| 5,809,457 | 9/1998 | Yee et al. | 701/221 |

*Primary Examiner*—Gary Chin
*Attorney, Agent, or Firm*—Lyon & Lyon LLP

[57] ABSTRACT

Processes and algorithms to determine and correct key error sources in an inertial navigator. These key error sources are azimuth misalignment error and all gyro drift rate errors ("North", "East" and "Down"). Thus the invention provides improved directional accuracy and improved navigation performance. The processes and algorithms can be implemented within the system computer to determine and correct for the system error sources thus determined automatically.

18 Claims, 4 Drawing Sheets

AUTOMATIC CORRECTION OF KEY ERROR SOURCES IN AN INERTIAL NAVIGATOR

BACKGROUND OF THE INVENTION

1. Field of the Invention

This invention relates in general to inertial navigators, and in particular to inertial navigators where it is desired to "correct" the system for key error sources in order to provide improved directional accuracy and improved navigational performance. 2. The Description of the Prior Art In the prior art, inertial navigators have been corrected in flight utilizing external navigation aid(s) (such as the Global Positioning System, GPS) and an optimal estimation filter. We use the term "correct" to mean the alignment and initialization of the system and the calibration (correction) of the various inertial navigator error sources. Such a technique suffers from the fact that many inertial navigator error sources are unobservable and thus uncorrectable by the techniques of the prior art. For example, it is not possible to distinguish between an accelerometer bias error and a level misalignment error, nor between an "East" Gyro Drift Rate and an azimuth misalignment error.

The present invention makes it possible to align and initialize the system "at rest" on the ground and/or periodically in-flight and to insure that the system is devoid of the effects of key error sources. The key error sources are the ones that provide for degraded directional accuracy and position errors that increase with time (specifically, level-axes drift rates, azimuth misalignment error and azimuth-axis drift rate).

The prior art, as practiced, is not adequate to accomplish this specific purpose. The present invention achieves this specific purpose and as such provides the techniques required to align and initialize the system "at rest" on the ground and/or periodically in-flight and to ensure that the system is devoid of the effects of the above key error sources.

SUMMARY OF THE INVENTION

An object of this invention is to provide techniques to align and initialize an inertial navigator "at rest" on the ground and/or periodically in-flight and to ensure that the system is devoid of the effects of key error sources (specifically, level-axes drift rates, azimuth misalignment error and azimuth-axis drift rate).

In summary, the invention consists of 1) adding "Rate Damping" to the level loops of the inertial navigator and 2) adding "Integral Control" from the "North" accelerometer loop to the azimuth "Down" gyro to effect gyro-compassing. This is done in a manner that the key error sources are observable and correctable.

The techniques of the present invention are effective "at rest" on the ground or in flight. The techniques may be utilized periodically in-flight to determine and correct for changes in the key error sources as the flight progresses over extended periods of time.

The outcome is an inertial navigator that is accurately aligned and initialized and devoid of azimuth misalignment error and all Gyro Drift Rate errors ("North", "East" and "Down"). Thus the inertial navigator is now capable of improved directional accuracy and improved navigational performance.

BRIEF DESCRIPTION OF THE DRAWINGS

FIG. 2 also shows the addition of "Integral Control" between the system "North" velocity $V_{NS}$, loop and the azimuth "Down" gyro.

The nomenclature of FIGS. 1 through 4 is as follows: Dotted lines are physical inputs, rather than system signals.

G=Gravity, approximately 32.2 feet/second$^2$ $\Omega$=Earth's angular rate with respect to inertial space, approximately 15 degrees/hour $R_{EO}$=Distance from the center of the Earth to the system $K_1$, $K_2$, $K_3$=Gains $\tau_1$, $\tau_2$=time constants $\theta$=system level misalignment about the system "North" axis $\phi$=system level misalignment about the system "East" axis $\psi$=system azimuth misalignment error about the system "Down" axis $V_E$="East" velocity $V_{ES}$=system "East" velocity $V_N$="North" velocity $V_{NS}$=system "North" velocity $\Delta DR_{GN}$=effective "North" Gyro Drift Rate $\Delta DR_{GE}$=effective "East" Gyro Drift Rate $\Delta DR_{GD}$=effective "Down" Gyro Drift Rate Lt=Latitude Lg=Longitude $\dot{Lt}$=Latitude rate $$\left( = \frac{V_N}{R_{EO}} \right)$$

$\dot{Lg}$=Longitude rate $$\left( = \frac{-V_E}{R_{EO} \cos Lt} \right)$$

$f(\phi)$=angular velocity which is a function of ($\phi$)

$f(\theta)$=angular velocity which is a function of $\theta$

DETAILED DESCRIPTION

Figure 1:
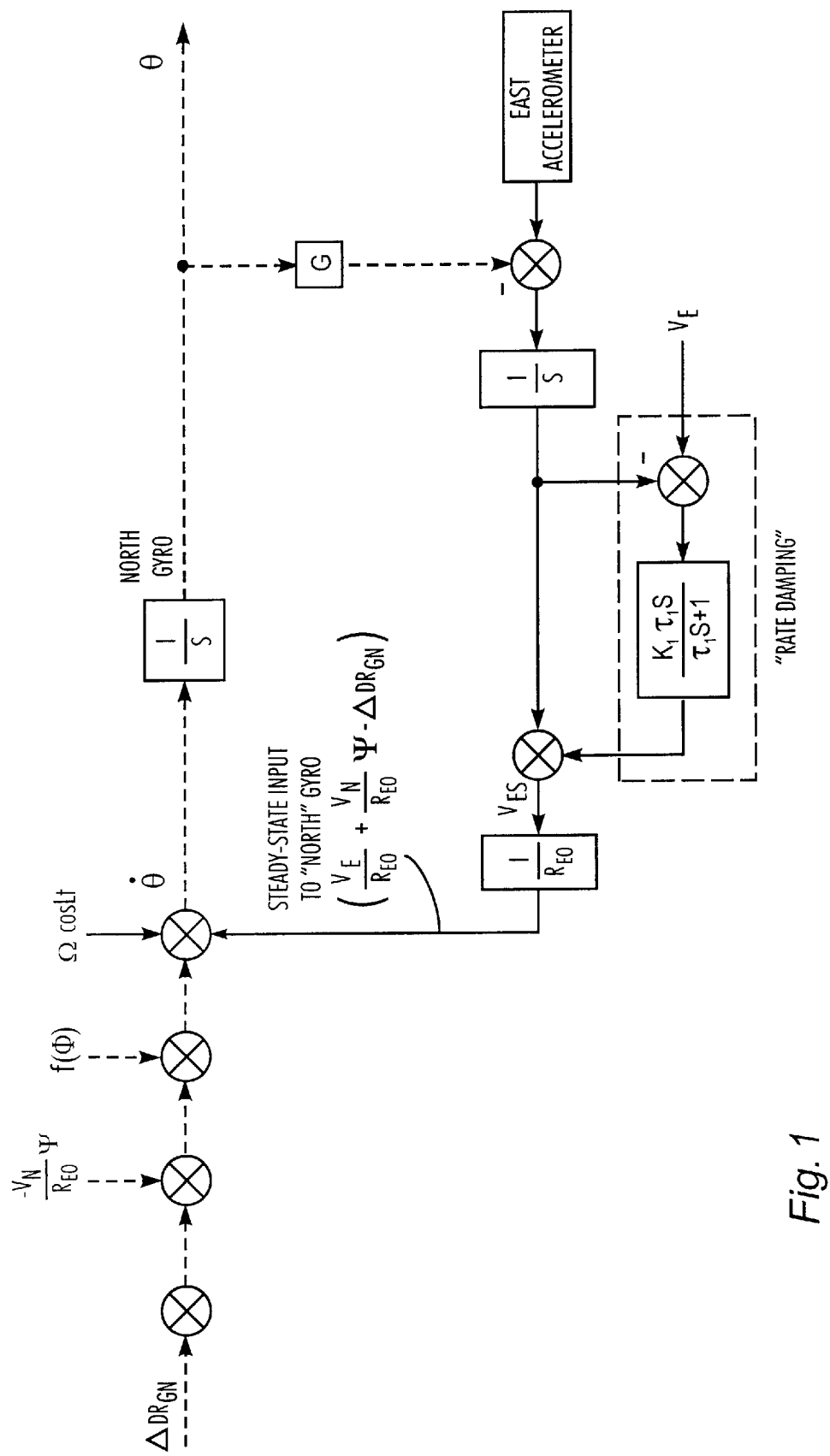
FIG. 1 shows the addition of "Rate Damping" to the system "East" velocity, $V_{ES}$, loop. $V_E$ is the "East" velocity derived from an external navigation aid (such as the Global Positioning System, GPS).
Figure 2:
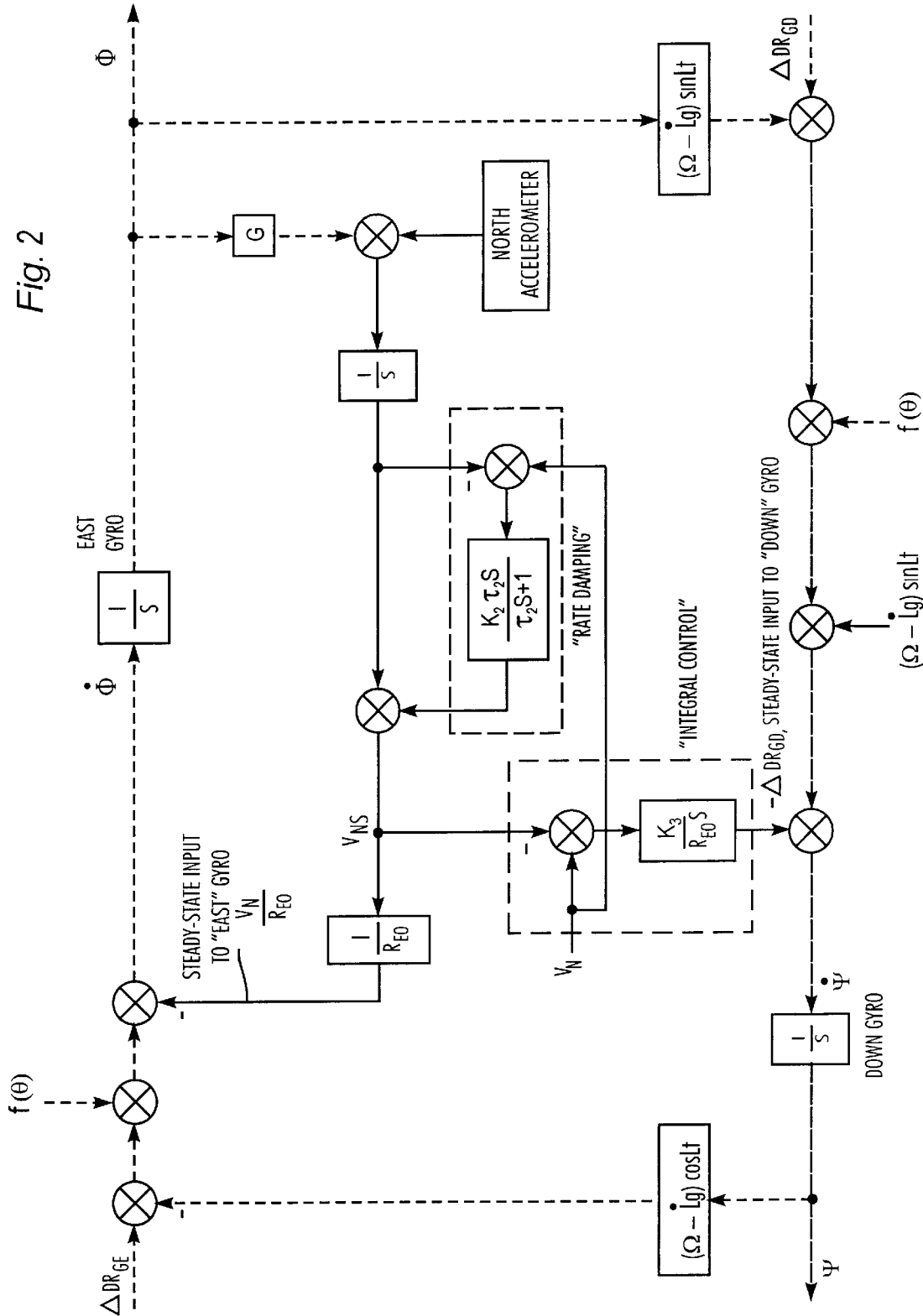
FIG. 2 shows the addition of "Rate Damping" to the system "North" velocity, $V_{NS}$, loop. $V_N$ is the "North" velocity derived from an external navigation aid (such as the Global Positioning System, GPS).
Figure 3:
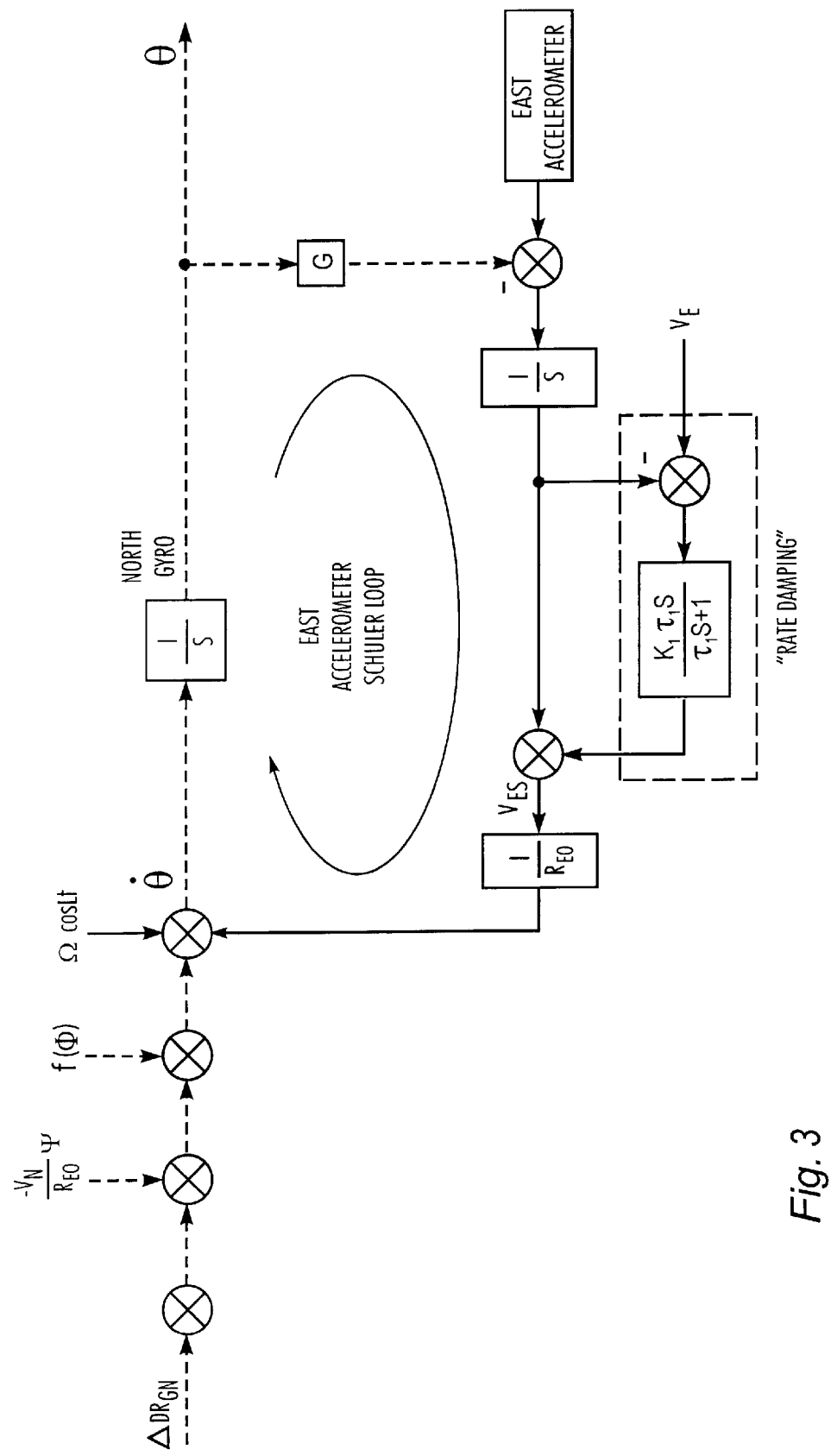
FIG. 3 and FIG. 4 are diagrams identifying the east accelerometer Schuler loop and the north accelerometer Schuler loop in FIG. 1 and FIG. 2, respectively.
Figure 4:
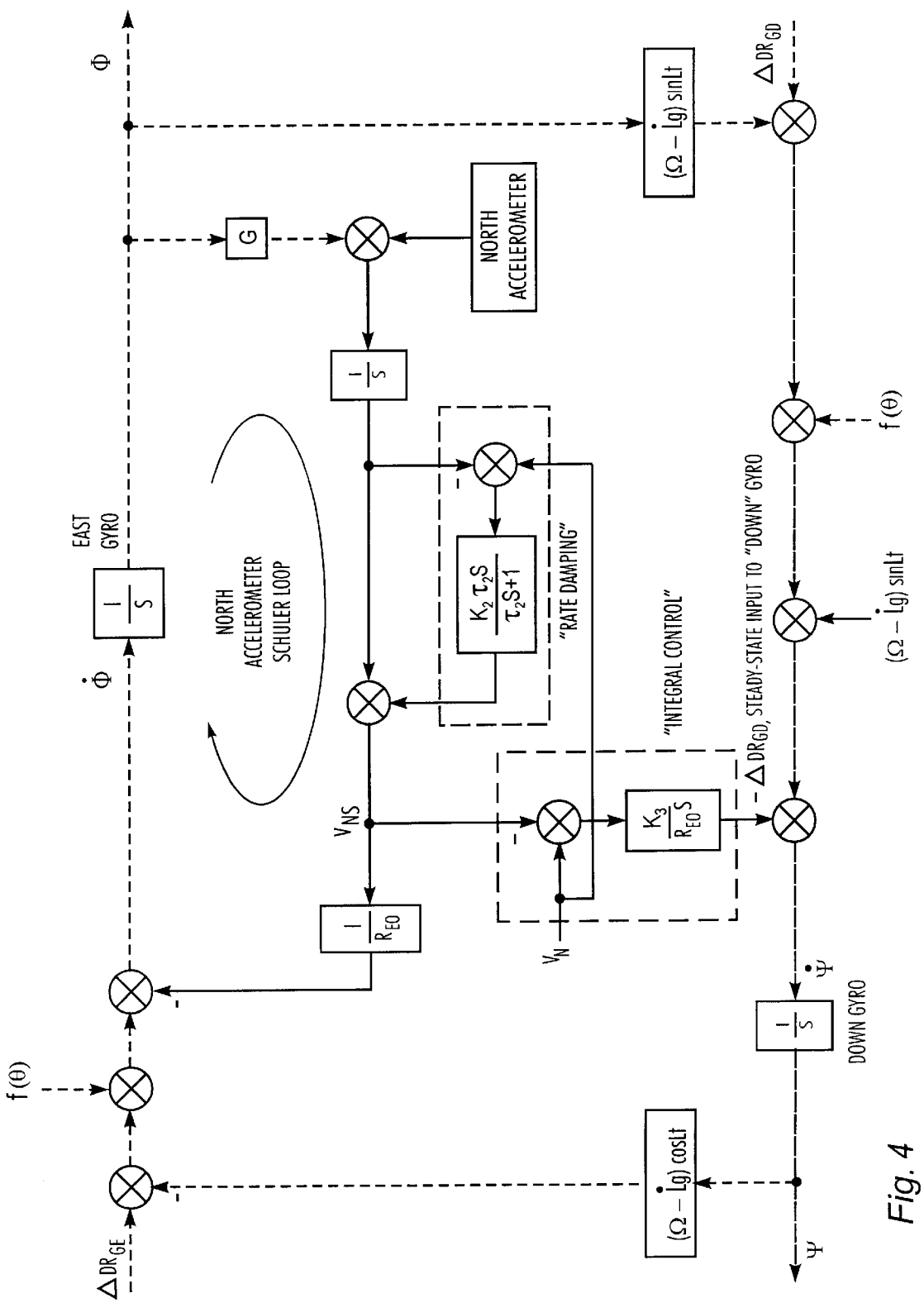

The present invention presents a process and algorithms that provides the techniques to align and initialize the system "at rest" and/or periodically in-flight and to ensure that the system is devoid of the effects of key error sources (specifically, level-axes drift rates, azimuth misalignment error and azimuth-axis drift rate). The techniques involve adding "Rate Damping" to the level axes as shown in FIG. 1 and FIG. 2 and to add "Integral Control" to the azimuth "Down" gyro to effect gyrocompassing. This causes the system to settle with final values as follows:

$\theta$, $\dot{\theta}$=0

$\phi$, $\dot{\phi}$=0

$\dot{\psi}=0$ $$\psi = \frac{\Delta DR_{GE}}{(\Omega - \dot{L}g)\cos Lt}$$

It is noted that the steady-state input to the "North" gyro is as follows $$\left(\frac{V_E}{R_{EO}} + \frac{V_N}{R_{EO}}\psi - \Delta DR_{GN}\right)$$

Once $\psi$ is known, one can solve for $\Delta DR_{GN}$, having values of $V_E$ and $V_N$ from the external navigation aid and knowledge of $R_{EO}$.

Gyrocompassing will cause the following from FIG. 2.

$$\psi = \frac{\Delta DR_{GE}}{(\Omega - \dot{L}g)\cos Lt}$$

The output of the "Integral Control" is as follows in the steady-state and can be utilized to determine and correct for $\Delta DR_{GD}$: $-\Delta DR_{GD}$ The processes and algorithms presented ensure that $\theta$ and $\dot{\theta}$ are zero and that $\phi$ and $\dot{\phi}$ are zero since this provides that the Schuler-tuned system can be represented by the model of an ideal navigation system with a pure and singular azimuth misalignment error. Thus the monitoring of cross-axis errors, which are a function of the azimuth misalignment error, can be utilized to accurately determine and correct for the azimuth misalignment error.

The techniques presented are effective for the system "at rest" on the ground and/or for periodically correcting the system in flight.

We first discuss the in-flight case. We have stated that this technique can be used periodically during flight to re-align and re-initialize the system and to re-correct the system for changes in key error sources.

The general in-flight case process starts with the system being placed in the (aided) navigation mode of FIG. 1 and FIG. 2. It is assumed that the system Latitude and Longitude are being corrected by an external navigation aid. The system is allowed to settle to its final values as shown in FIG. 1 and FIG. 2, with the following final values:

$\theta, \dot{\theta} = 0$ $\phi, \dot{\phi} = 0$ $\dot{\psi} = 0$ $$\psi = \frac{\Delta DR_{GE}}{(\Omega - \dot{L}g)\cos Lt}$$

At this point, an external navigation aid is utilized to determine the cross-axis velocity errors and $\psi$ is determined from the following:

$$\psi = \frac{\Delta V_{NS}}{V_E}$$

or $$\psi = \frac{-\Delta V_{ES}}{V_N}$$

Where $\Delta V_{NS}$ and $\Delta V_{ES}$ are the cross-axis velocity errors
$V_E = V_{ES} + \Delta V_{ES}$
where $\Delta V_{ES} = -V_N\psi$
$V_N = V_{NS} + \Delta V_{NS}$
where $\Delta V_{NS} = -V_E\psi$
$-\Delta DR_{GN}$ is determined from the input to the "North" Gyro (see FIG. 1, referring to the bracketed quantity):

$$-\Delta DR_{GN} = \left(\frac{V_E}{R_{EO}} + \frac{V_N}{R_{EO}}\psi - \Delta DR_{GN}\right) - \frac{V_E}{R_{EO}} - \frac{V_N}{R_{EO}}\psi$$

$-\Delta DR_{GD}$ is determined from the output of the "Integral Control" (see FIG. 2).

$\Delta DR_{GE}$ is determined from $$\Delta DR_{GE} = \psi(\Omega - \dot{L}g)\cos Lt$$

or $$\Delta DR_{GE} = \psi\left(c\cos L + \frac{V_E}{R_{EO}}\right)$$

At this point, the system is corrected for $\psi$, cross-axis velocity errors, gyros are corrected for $\Delta DR_{GN}$, $\Delta DR_{GD}$, $\Delta DR_{GE}$ and the system inputs to the gyros are corrected as follows:

"North" Gyro: correction is $$\left(-\frac{V_N}{R_{EO}}\psi + \Delta DR_{GN}\right)$$

"East" Gyro : No correction
"Down" Gyro: Correction is $+\Delta DR_{GD}$
so that and $\theta$, $\dot{\theta}$, $\phi$ and $\dot{\phi}$ remain zero.

At this point, the system is corrected for the errors thus determined and the system is switched to the (unaided) navigate mode (the "Rate Damping" and "Integral Control" having been eliminated). The process is ended and the system, now devoid of the effects of the key error sources, will continue to navigate providing improved directional accuracy and improved navigation performance.

To recapitulate, in the "in flight" scenario, the inertial navigator is tuned periodically during flight to re-align and re-initialize the system and to re-correct the system for changes in key error sources. The "in-flight" scenario preferably involves the following process:

1) First, it is assumed that the inertial navigator has been modified by addition of the "rate damping" and "integral control" blocks shown in FIGS. 1 and 2. Typically, this modification may involve programming of the system computer which is utilized in inertial navigation functions. As part of that process, it is assumed that appropriate values of gains ($K_1$, $K_2$, $K_3$) and time constants ($\tau_1$, $\tau_2$) have been previously selected for the "rate damping" and "integral control" blocks, so as to provide the desired "settling time" of the system. The invention is not dependent on the particular gain values or time constants, which can be selected by those skilled in the art based on general principles of control theory.

2) The inertial navigator is placed in the (aided) navigation mode of FIGS. 1 and 2.
3) The system is allowed to settle out to its final values. The "settling" time depends on the time constants selected in step (1) above.
4) An external navigation aid (such as GPS) is utilized to determine the "true" velocity, which is then used to determine cross-axis velocity errors and the azimuth misalignment error. The cross-axis velocity errors $\Delta V_{NS}$ and $\Delta V_{ES}$ are the differences between the "true" north or east velocity and the "system" north or east velocity, respectively, caused by the azimuth misalignment error. The azimuth misalignment error can be derived from the cross-axis velocity errors according to the formula set forth above.
5) At this point, the control loops of FIGS. 1 and 2 are used to derive the "North" gyro drift rate ("$\Delta DR_{GN}$") and "Down" gyro drift rate ("$\Delta DR_{GD}$"). The "North" gyro drift rate ($\Delta DR_{GN}$) and "Down" gyro drift rate ($\Delta DR_{GD}$) may be derived directly from the parameters present in the system computer. The "North" gyro drift rate ($\Delta DR_{GN}$) is derived from the control loop shown in FIG. 1, by subtracting off east and north velocity components $V_E/R_{E0}$ and $\psi \cdot V_N/R_{E0}$ from the steady-state input to the "North" gyro, which leaves the component corresponding to the "North" gyro drift rate. Likewise, the "Down" gyro drift rate ($\Delta DR_{GD}$) is derived from the control loop shown in FIG. 2, and corresponds directly in magnitude (but opposite sign) to the output of the "integral control" block thereof. Rate damping causes the Schuler loops to settle out with $\theta$, $\dot{\theta}$, $\phi$ and $\dot{\phi}$ equal to zero, and causes the system inputs to the North and East Gyros to settle out to the quantities shown in brackets in FIGS. 1 and 2. These quantites are those required to keep $\theta$, $\dot{\theta}$, $\phi$ and $\dot{\phi}$ equal to zero.
6) The "East" gyro drift rate $\Delta DR_{GE}$ may be determined according to formulas set forth above.
7) The system is then corrected for the azimuth misalignment error $\psi$ and the cross-axis velocity errors.
8) The gyros are corrected for the "North" gyro drift rate ($\Delta DR_{GN}$) and the "Down" gyro drift rate ($\Delta DR_{GD}$), and the system inputs to the gyros are also corrected. The system input to the "North" gyro is corrected by injecting a component of equal magnitude but opposite sign to the "North" gyro drift rate, and by subtracting a component related to the azimuth misalignment error. Preferably, the system input to the "North" gyro is provided with a correction of $(-\psi \cdot V_N/R_{E0} + \Delta DR_{GN})$. The system input to the "Down" gyro is corrected by injecting a component of equal magnitude but opposite sign to the "Down" gyro drift rate ($\Delta DR_{GD}$). The system input to the "East" gyro does not need correction.
9) The system is then switched to the "unaided" navigate mode, and the "rate damping" and "integral control" are removed.
10) The inertial navigator will then navigate more accurately because the key error sources have been mitigated.

We now turn our attention to the techniques of the present invention to be utilized for the "at rest" on the ground case. The process starts with the system switched from the completion of its normal align and initialize mode to the navigation mode of FIG. 1 and FIG. 2. It is assumed that the system Latitude and Longitude are being corrected to the constant values of the ground location. The system is allowed to settle to final values as follows:

$$\theta, \dot{\theta} = 0$$

$$\phi, \dot{\phi} = 0$$

$$\dot{\psi} = 0$$

$$\psi_o = \frac{\Delta DR_{GE}}{\Omega \cos Lt_o}$$

- $\Delta DR_{GN}$ is determined from the input to the "North" gyro (see FIG. 1). Note that $V_E$ and $V_N$ are equal to zero, so that the bracketed quantity is simply $-\Delta DR_{GN}$.
- $\Delta DR_{GD}$ is determined from the output of the "Integral Control" (see FIG. 2).

The gyros are now corrected for $\Delta DR_{GN}$ and $\Delta DR_{GD}$, the "Rate Damping" and the "Integral Control" are eliminated, the level axes loop (solid line) inputs to the gyros shown in FIG. 1 and FIG. 2 are corrected to account for the $\Delta DR_{GN}$ and $\Delta DR_{GD}$ corrections to the gyros (in order to keep $\theta$, $\dot{\theta}$, $\phi$ and $\dot{\phi}$ equal to zero), that is, the required corrections are:

"North" Gyro: $+\Delta DR_{GN}$ (cancels $-\Delta DR_{GN}$)

"East" Gyro: No correction

"Down" Gyro: $+\Delta DR_{GD}$ (cancels $-\Delta DR_{GD}$))

and the system is switched to the (unaided) navigate mode. It is important to keep $\theta$, $\dot{\theta}$, $\phi$ and $\dot{\phi}$ equal to zero so that the system is left with only a pure and singular azimuth misalignment error.

Take-off can now occur.

After take-off, and say 21 to 42 minutes, more or less, into the flight, external navigation aid(s) are utilized to determine $\psi_0$ as follows:

$$\psi_o = \frac{\Delta V_{NS}}{V_E}$$

and/or $$\psi_o = \frac{-\Delta V_{ES}}{V_N}$$

and/or $$\psi_o = \frac{-\Delta S_{Lt}}{R_{EO} \cos Lt (Lg_p - Lg_o)}$$

and/or $$\psi_o = \frac{\Delta S_{Lg}}{R_{EO}(Lt_p - Lt_o)}$$

Where $\Delta V_{NS}$ is the cross-axis velocity error associated with $V_{NS}$ ($V_N = V_{NS} + \Delta V_{NS}$);

$\Delta V_{ES}$ is the cross-axis velocity error associated with $V_{ES}$ ($V_E = V_{ES} + \Delta V_{ES}$);

$\Delta S_{Lt}$ is the cross-axis position error associated with the change in Longitude ($Lg_p - Lg_o$);

$\Delta S_{Lg}$ is the cross-axis position error associated with the change in Latitude ($Lt_p - Lt_o$);

$Lt_o$, $Lg_o$ are the Latitude, Longitude of the point "o", where the system was switched to the (unaided) navigate mode.

$Lt_p$, $Lg_p$ are the Latitude, Longitude of the point "p" where $\psi_0$ is determined.

Note that the distance from point "o" to point "p" is the point-to-point distance regardless of the path taken to get from one point to the other.

Once $\psi_0$ is determined the system is corrected for $\psi_0$, the $\Delta DR_{GE}$ that caused the $\psi_0$ and the cross-axis velocity and position errors caused by $\psi_0$.

The inputs to the gyros should be corrected to be as follows:

"North" Gyro $\quad \Omega \cos Lt + \dfrac{V_E}{R_{EO}}$ $\left( \text{correction is} - \dfrac{V_N}{R_{EO}} \psi_o \right)$ "East" Gyro $\quad -\dfrac{V_N}{R_{EO}}$ (no correction)

"Down" Gyro $\quad -\Omega \sin Lt - \dfrac{V_E}{R_{EO}} \tan Lt$ (no correction)

Again, the above corrections are done to keep $\theta$, $\dot{\theta}$, $\phi$ and $\dot{\phi}$ equal to zero.

This completes the process for the "at rest" on the ground case. The flight portion is required to make $\psi_0$ observable so that it can be corrected.

To recapitulate, the "at-rest" scenario involves the following process:

1) First, it is assumed that the inertial navigator has been modified by addition of the "rate damping" and "integral control" blocks shown in FIGS. 1 and 2. Typically, this modification may involve programming of the system computer which is utilized in inertial navigation functions.

2) As part of step (1), appropriate values of gains ($K_1$, $K_2$, $K_3$) and time constants ($\tau_1$, $\tau_2$) are selected for the "rate damping" and "integral control" blocks, so as to provide the desired "settling time" of the system. Note that the invention is not dependent on the particular gain values or time constants, which can be selected by those skilled in the art based on general principles of control theory.

3) The system is aligned and initialized, prior to being put in the navigation ("aided") mode.

4) The inertial navigator is placed in the navigation ("aided") mode.

5) The system is allowed to settle out to its final values, prior to take off. The "settling" time depends on the time constants selected in step (2) above.

6) The steady-state signals are read from the various instrumentation in order to derive the "North" gyro drift rate ("$\Delta DR_{GN}$") and "Down" gyro drift rate ("$\Delta DR_{GD}$") while at rest. The "North" gyro drift rate and "Down" Gyro drift rate may be derived directly from the parameters present in the system computer. The "North" gyro drift rate is derived from the control loop shown in FIG. 1. As can be seen in FIG. 1, the steady-state input to the "North" gyro is given by the equation shown therein; but because the "true" east velocity $V_E$ and north velocity $V_N$ are zero (while the system is "at rest"), the components of the "system" east velocity $V_{ES}$ dependent upon the "true" east and north velocities drop out, leaving only a component $\Delta DR_{GN}$ corresponding to the inverse of the "North" gyro drift rate. Likewise, as can be seen in FIG. 2, the steady-state input to the "Down" gyro is given by the output of the "integral control" block, and corresponds to the inverse of the "Down" gyro drift rate $\Delta DR_{GD}$.

Rate damping causes the Schuler loops to settle out with $\theta$, $\dot{\theta}$, $\phi$ and $\dot{\phi}$ equal to zero, and causes the system inputs to the North and East Gyros to settle out to the quantities shown in brackets in FIGS. 1 and 2. These quantites are those required to keep $\theta$, $\dot{\theta}$, $\phi$ and $\dot{\phi}$ equal to zero.

7) The system is then corrected for the "North" gyro drift rate $\Delta DR_{GN}$ and the "Down" gyro drift rate $\Delta DR_{GD}$, by injecting into the system signals of equal magnitude but opposite in sign to the measured errors (i.e., the "North" and "East" gyro drift rates).

8) The system is then switched to the "unaided" navigate mode, and the "rate damping" and "integral control" are removed.

9) Take-off (or other motion) then is permitted, and after a suitable period (e.g., 21–42 minutes), external navigation aid(s) are utilized to determine the initial azimuth misalignment error about the "down" axis ("$\psi_0$"). A variety of ways may be used to determine the initial azimuth misalignment error $\psi_0$. For example, the initial azimuth misalignment error may be determined by a cross-axis velocity error (either that associated with "system" north velocity $V_{NS}$ or "system" east velocity $V_{ES}$), or a cross-axis position error. Note that the motion of the inertial navigator is needed to make the initial azimuth misalignment error $\psi_0$ observable.

10) Once the initial azimuth misalignment error $\psi_0$ has been determined, the "East" gyro drift rate may be determined and compensated for. Specific formula for determining the "East" gyro drift rate are given above, with respect to the "in-flight" scenario.

11) The system is corrected for the initial azimuth misalignment error $\psi_0$, the "East" gyro drift rate $\Delta DR_{GE}$ that caused the initial azimuth misalignment error $\psi_0$, and the cross-axis velocity and position errors caused by the initial azimuth misalignment error $\psi_0$. The inputs to the "East" gyro and "Down" gyro need no correction, but the input to the "North" gyro is corrected by subtracting the quantity $(V_N/R_{EO}) \cdot \psi_0$, where $V_N$ represents the "true" north velocity, and $R_{EO}$ represents the distance from the center of the Earth to the system.

12) The inertial navigator will then navigate more accurately because the key error sources have been mitigated.

Thus, at least two examples ("at rest" and "in-flight") of systems and processes in accordance with preferred embodiment(s) are described herein, and can be utilized to mitigate key error sources and provide more accurate navigation using an inertial navigator. The addition of "rate damping" and "integral control" blocks to the conventional control system result in a unique steady-state condition of the control loops that allow observation of the key error sources, and permit these key error sources to be corrected after a period of time sufficient to allow their manifestation. Moreover, corrections pertaining to both the "North" gyro and the "Down" gyro have been described herein.

Those skilled in the art can incorporate the present invention into the particular implementation of their inertial navigator.

Those skilled in the art can select the appropriate values of gains ($K_1$, $K_2$, $K_3$) and time constants ($\tau_1$, $\tau_2$) to provide the necessary "settling time" of the system to achieve the desired final values, as follows:

$\theta, \dot\theta = 0$ $\phi, \dot\phi = 0$ $\dot\psi = 0$ $\psi = \dfrac{\Delta DR_{GE}}{(\Omega - \dot Lg)\cos Lt}$ The process and algorithms of the present invention apply to gimballed and strapdown systems; to local vertical, local north and all other analytic systems such as geocentric vertical, space-stabilized azimuth analytic systems. Also, the processes and algorithms of the present invention apply to optimal estimation filters wherein their implementation achieves the intended purpose by incorporation of the processes and algorithms into the system model.

Note that the processes and algorithms can be programmed into the system computer as described in the present invention so as to automatically correct the system.

I claim:

1. An inertial navigator, comprising:
    a plurality of gyros, said gyros providing a north gyro input signal, an east gyro input signal, and a down gyro input signal;
    a plurality of accelerometers;
    means for converting measurements from said accelerometers to a system east velocity and a system north velocity; and
    a control system comprising a first control loop and a second control loop;
    wherein said first control loop comprises a first rate damping control block responsive to said system east velocity and an external east velocity measurement, said first control loop generating an observable signal proportional to a north gyro drift rate when said accelerometers and said gyros are at rest and the first control loop is in a steady state;
    wherein said second control loop comprises a second rate damping control block responsive to said system north velocity and an external north velocity measurement, said second control loop generating an adjusted system north velocity using an output of said second rate damping control block; and
    wherein said second control loop is connected to an integral control block responsive to a difference between said adjusted system north velocity and said external north velocity measurement, said integral control block outputting an observable signal proportional to a down gyro drift rate when the second control loop is in a steady state.

2. The inertial navigator of claim 1, further comprising a computer system programmed to correct the control system for said north gyro drift rate and said down gyro drift rate after a period of time of sufficient duration to place the first control loop and second control loop in a steady state.

3. An inertial navigator, comprising:
    a plurality of gyros, said gyros providing a north gyro input signal, an east gyro input signal, and a down gyro input signal;
    a plurality of accelerometers from which velocity measurements can be derived; and
    a control system comprising a plurality of control loops, said control loops including an east velocity control loop and a north velocity control loop receiving as inputs said velocity measurements from said accelerometers, said control system generating an observable signal proportional to a north gyro drift rate when said accelerometers and said gyros are at rest and said east velocity control loop is in a steady state, and generating an observable signal proportional to a down gyro drift rate when said accelerometers and said gyros are at rest and said north velocity control loop is in a steady state.

4. The inertial navigator of claim 3, wherein said control system further comprises means for correcting the inertial navigator for said north gyro drift rate and said down gyro drift rate after a period of time of sufficient duration to place the east velocity control loop and north velocity control loop in a steady state.

5. The inertial navigator of claim 3, wherein said east velocity control loop comprises a rate damping control block responsive to a system east velocity and an external east velocity measurement, said east velocity control loop generating said observable signal proportional to said north gyro drift rate when said accelerometers and said gyros are at rest and said east velocity control loop is in a steady state.

6. The inertial navigator of claim 5, wherein said north velocity control loop comprises a second rate damping control block responsive to a system north velocity and an external north velocity measurement, said north velocity control loop generating an adjusted system north velocity using an output of said second rate damping control block; and
    wherein said control system further comprises an integral control block responsive to a difference between said adjusted system north velocity and said external north velocity measurement, said integral control block outputting said observable signal proportional to said down gyro drift rate when said north velocity control loop is in a steady state.

7. The inertial navigator of claim 3, wherein said control system further comprises means for determining initial azimuth misalignment error and east gyro drift rate after a period of flight using cross-axis position or velocity errors, and correcting the inertial navigator for said initial azimuth misalignment error and said east gyro drift rate.

8. The inertial navigator of claim 7, wherein said control system corrects the inertial navigator for said initial azimuth misalignment error and said east gyro drift rate by subtracting from an input to the north gyro a quantity corresponding to $(V_N/R_{E0})\psi_0$, where $V_N$ represents a true north velocity as obtained from an external navigation aid, $R_{E0}$ represents the distance from the center of the Earth to the inertial navigator, and $\psi_0$ represents the initial azimuth misalignment error.

9. The inertial navigator of claim 3, wherein said control system operates generate said observable signal proportional to said north gyro drift rate and said observable signal proportional to said down gyro drift rate when the inertial navigator is at rest.

10. The inertial navigator of claim 3, wherein said control system operates to generate said observable signal proportional to said north gyro drift rate and said observable signal proportional to said down gyro drift rate when the inertial navigator is in flight.

11. A method for determining and correcting error sources in an inertial navigator, said method comprising the steps of:
    placing the inertial navigator in an aided navigation mode;
    deriving a system east velocity from an east accelerometer;
    generating a north gyro input signal from said system east velocity and from an east velocity measurement provided from an external navigation aid, said step of generating a north gyro input signal comprising the step of applying said system east velocity and said east velocity measurement to a first rate damping block;

deriving a system north velocity from a north accelerometer;

generating an east gyro input signal from said system north velocity and from a north velocity measurement provided from said external navigation aid, said step of generating an east gyro input signal comprising the step of applying said system north velocity and said north velocity measurement to a second rate damping block;

generating a down gyro input signal, said step of generating a down gyro input signal comprising the step of applying an output of said second rate damping control block and said north velocity measurement to an integral control block;

waiting a period of time of sufficient duration after placing the inertial navigator in the aided navigation mode to allow an output of said first rate damping block and the output of said second rate damping block to settle into a steady state;

reading said north gyro input signal when in said steady state, and deriving a north gyro drift rate therefrom;

reading said down gyro input signal when in said steady state, and deriving a down gyro drift rate therefrom; and correcting said inertial navigator for said north gyro drift rate and said down gyro drift rate.

12. The method of claim 11, wherein said step of reading said north gyro input signal when in said steady state and deriving said north gyro drift rate therefrom comprises the step of reading said north gyro input signal before said inertial navigator has moved from its initial position, and wherein said step of correcting said inertial navigator for said north gyro drift rate and said down gyro drift rate comprises the step of adjusting a north gyro reading by a quantity equal to said north gyro input signal.

13. The method of claim 11, wherein said step of reading said north gyro input signal when in said steady state and deriving said north gyro drift rate therefrom comprises the step of reading said north gyro input signal while said inertial navigator is in flight and subtracting from said north gyro input signal components of east and north velocity, and wherein said step of correcting said inertial navigator for said north gyro drift rate and said down gyro drift rate comprises the steps of adjusting a north gyro reading by a quantity equal to said north gyro input signal with said east and north velocity components subtracted out.

14. The method of claim 11, wherein said step of reading said down gyro input signal when in said steady state and deriving said down gyro drift rate therefrom comprises the step of reading said down gyro input signal, and wherein said step of correcting said inertial navigator for said north gyro drift rate and said down gyro drift rate comprises the step of adjusting a down gyro reading by a quantity equal to said down gyro input signal.

15. The method of claim 11, wherein said first rate damping block and said second rate damping block each have a frequency characteristic given by $K.\tau.s/(\tau.s+1)$, where K represents a gain constant, and $\tau$ represents a time constant.

16. The method of claim 11, further comprising the steps of:

calculating an initial azimuth misalignment error from a cross-axis position or velocity error;

calculating an east gyro drift rate based upon said initial azimuth misalignment error; and correcting the inertial navigator for said initial azimuth misalignment error and said east gyro drift rate.

17. The method of claim 16, wherein said step of correcting the inertial navigator for said initial azimuth misalignment error and said east gyro drift rate comprises the step of adjusting said north gyro input signal by a quantity corresponding to $(V_N/R_{EO})\psi_0$, where $V_N$ represents a true north velocity as obtained from said external navigation aid, $R_{EO}$ represents a distance from the center of the Earth to the inertial navigator, and $\psi_0$ represents the initial azimuth misalignment error.

18. A method for determining and correcting error sources in an inertial navigator, said method comprising the steps of:

placing the inertial navigator in an aided navigation mode;

deriving a system east velocity reading and a system north velocity reading from a plurality of accelerometers;

calculating a north gyro drift rate using an east accelerometer Schuler loop with rate damping, with the east accelerometer Schuler loop in a stead state condition;

calculating a down gyro drift rate using a north accelerometer Schuler loop with rate damping and an azimuth loop with integral control, with the north accelerometer Schuler loop and the azimuth loop in a steady state condition; and correcting the inertial navigator for said north gyro drift rate and said down gyro drift rate.

* * * * *

UNITED STATES PATENT AND TRADEMARK OFFICE
CERTIFICATE OF CORRECTION

PATENT NO.    : 6,032,099
DATED         : February 29, 2000
INVENTOR(S)   : Manuel Fernandez It is certified that error appears in the above-identified patent and that said Letters Patent is hereby corrected as shown below:

IN THE CLAIMS (1) At col. 10, line 47, claim 8, "$(V_N/R_{E0})\psi_0$" should read "$(V_N/R_{E0})\cdot\psi_0$".

(2) At col. 10, line 52, claim 9, after "operates" insert --to--.

(3) At col. 10, line 64, claim 11, after "system", "cast" should be "east".

(4) At col. 12, line 11, claim 15, "$K.\tau.s/(\tau.s + 1),$" should be "$K\cdot\tau\cdot s/(\tau\cdot s + 1),$".

(5) At col. 12, line 26, claim 17, "$(V_N/R_{E0})\psi_0$" should be "$(V_N/R_{E0})\cdot\psi_0$".

Signed and Sealed this

Fifteenth Day of May, 2001

Attest:

NICHOLAS P. GODICI

Attesting Officer          Acting Director of the United States Patent and Trademark Office